G. W. BEADLE.
APPARATUS FOR PRESSING UP SOUND RECORDS AND THE LIKE.
APPLICATION FILED MAR. 4, 1918.
1,372,992.
Patented Mar. 29, 1921.
3 SHEETS—SHEET 1.
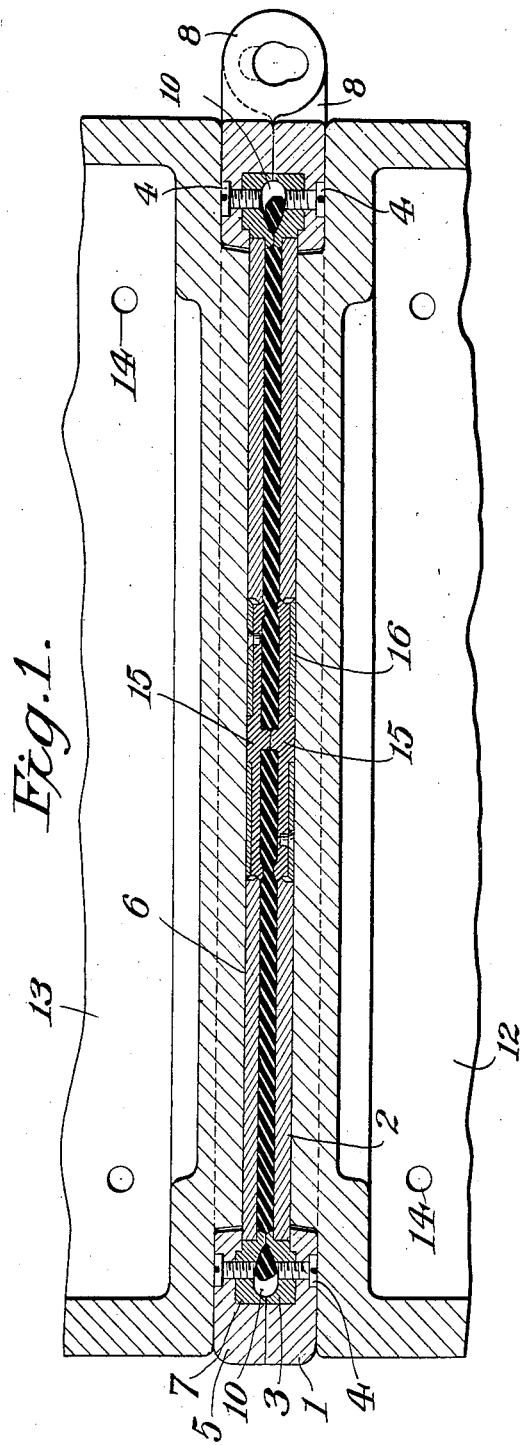
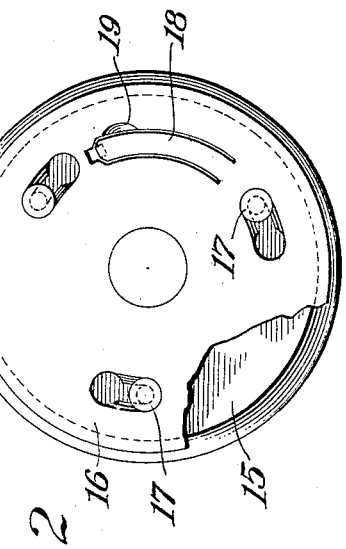
INVENTOR:
George W. Beadle,
BY
Mauro, Cameron, Lewis, & Massie,
ATTORNEYS.

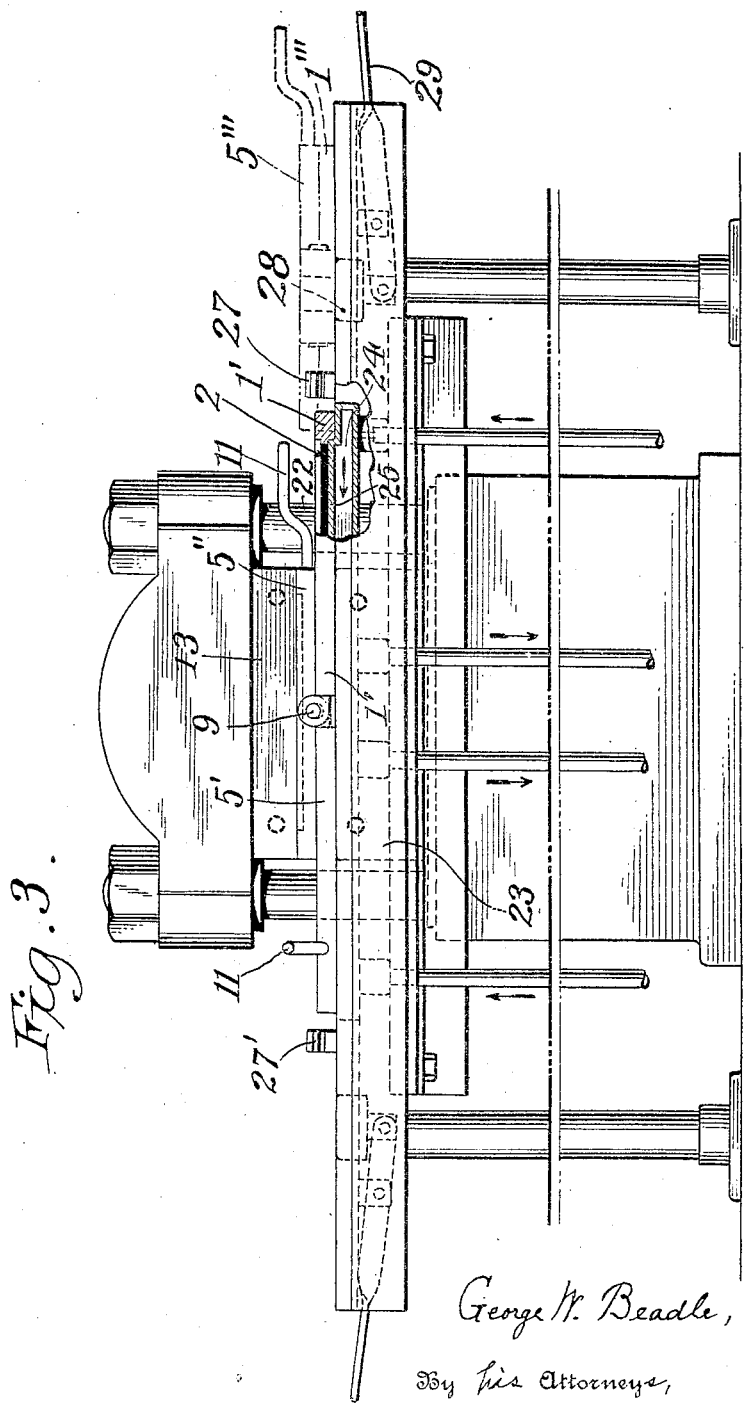

G. W. BEADLE.
APPARATUS FOR PRESSING UP SOUND RECORDS AND THE LIKE.
APPLICATION FILED MAR. 4, 1918.
1,372,992.
Patented Mar. 29, 1921.
3 SHEETS—SHEET 3.
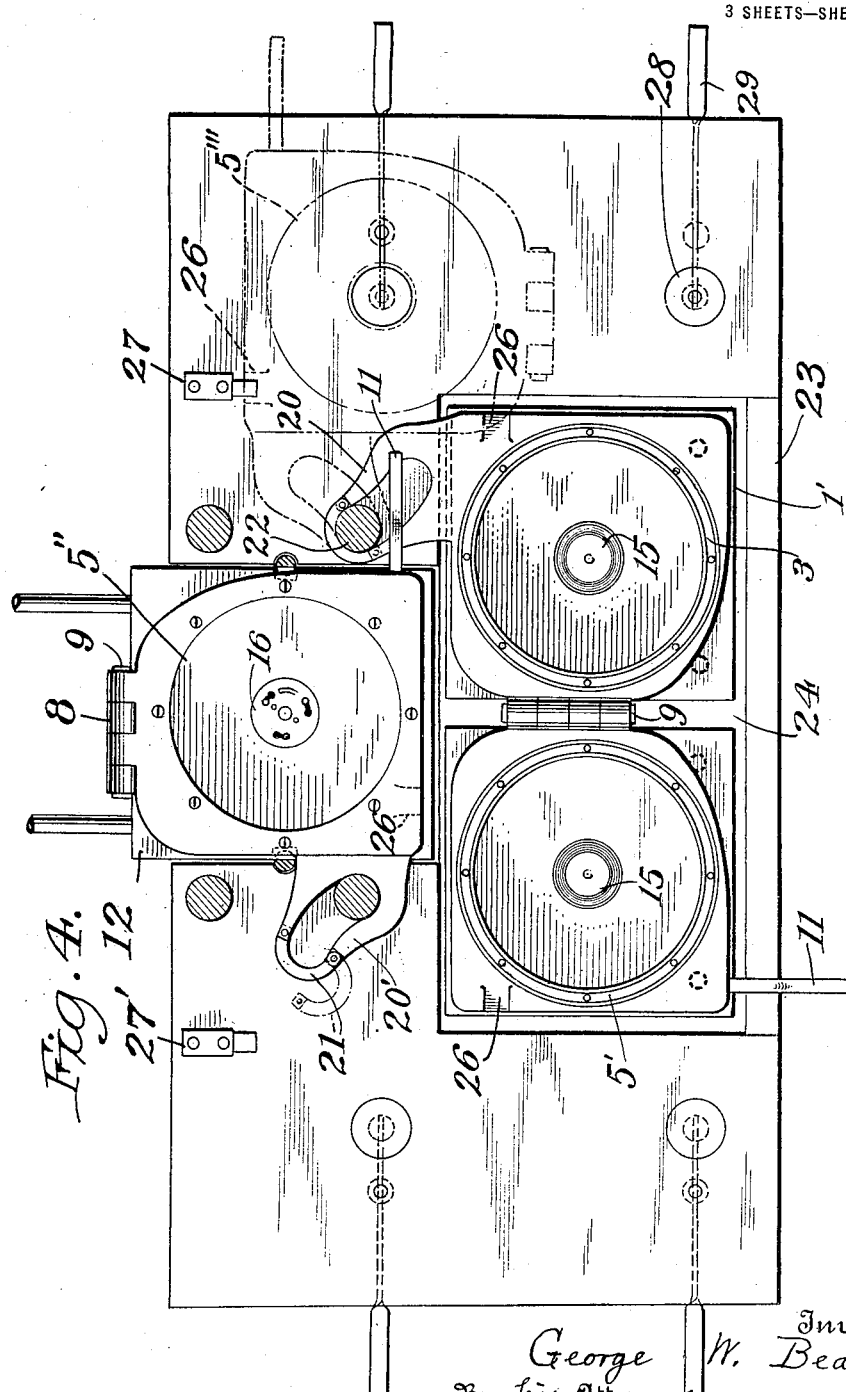
Inventor:
George W. Beadle,
By his Attorneys,
Mauro, Cameron, Lewis, Massie

UNITED STATES PATENT OFFICE.

GEORGE W. BEADLE, OF NEW ROCHELLE, NEW YORK, ASSIGNOR, BY MESNE ASSIGNMENTS, TO COLUMBIA GRAPHOPHONE MANUFACTURING COMPANY, OF BRIDGEPORT, CONNECTICUT, A CORPORATION OF DELAWARE.

APPARATUS FOR PRESSING UP SOUND-RECORDS AND THE LIKE.

1,372,992.  Specification of Letters Patent.  Patented Mar. 29, 1921.

Application filed March 4, 1918. Serial No. 220,314.

*To all whom it may concern:*

Be it known that I, GEORGE W. BEADLE, a citizen of the United States of America, and a resident of New Rochelle, New York, have invented a new and useful Improvement in Apparatus for Pressing Up Sound-Records and the like, which invention is fully set forth in the following specification.

This invention relates primarily to the pressing-up of plastic-material to form disk sound-records, but it can be employed for other analogous purposes. The main object and result of the invention is to increase the output of such articles by shortening the time heretofore required for heating and cooling the molds and their contents; by facilitating the operations of filling the molds or pressing-up the sound-records or other articles, and of removing the pressed-up articles from the molds, and by greatly reducing or altogether eliminating the wear and tear upon the mold member, and also the number of "discards" entailed by the practices hitherto employed.

Among the features of the invention are: the reduction of the amount of metal required in the mold members or dies, as by employing skeleton frames or mere rings to which the edges of the matrices are secured, leaving their reverse faces free and exposed for direct heating and chilling, in connection with a press having correspondingly-shaped hollow temperature-changing platens coming into direct contact with the reverse faces of said matrices; the hinging together of two such dies, so as to be foldable into a "book" mold; the alternate use, in a continuous process, of two such molds with the same press; the provision, adjacent the press, and flush with the lower platen in its lowered position, of a table provided with heating-regions for the dies; and the employment of mold openers and of ejecting-devices. The invention consists further of the combination of any two or more of these features, and also of the various details hereinafter set forth and claimed.

The invention is not limited to any particular physical embodiment; but on the contrary is susceptible of being expressed in different structures and forms, and certain of its features may be employed to the exclusion of others, without departing from the spirit of the invention as set forth in the appended claims. However, the invention will be best understood in connection with the following description of the preferred embodiment thereof, employed for pressing-up disk sound-records, and as applied to an ordinary hydraulic press such as used in that service, all as conventionally illustrated in the accompanying drawings, in which—

Figure 1 is a vertical section through a mold located between the two hollow platens of a press;

Fig. 2 is an enlarged bottom plan, with parts broken away, of one of the record ejecting-plates located at the center of each matrix;

Fig. 3 is a front elevation of a table and press showing one mold as lying open on the table in front of the press in position to be heated, a part of the mold member and steam chest being shown in section; another position of the mold is shown in dotted lines at the right of the figure; the press is shown as closed upon a second mold; and Fig. 4 is a plan view of the apparatus and arrangement of Fig. 3, with the top portion or head of the press removed.

The invention is preferably practised with a pair of molds whereby one mold may be within the press while a second mold is being prepared for subsequent insertion therein. These molds are substantial duplicates and each mold comprises a pair of upper and lower dies preferably hinged so as to open and close book fashion. The term die is to be understood as including the matrix proper and the means to which the latter is secured.

The dies of a mold are substantial duplicates except that one of them, the lower, has means for movably connecting it to the press. It will therefore be appreciated that the lower die alone may be swung into and out of the press, the upper platen of the press in such case contacting directly with the formable material to press it into intimate contact with the lower die. While the invention is susceptible for certain purposes of use as above indicated, the preferred construction contemplates, in the manufacture of sound records, the character of mold indicated in the drawings.

The preferred form of the new mold comprises a pair of plates 1, preferably of the exterior contour indicated by 1' in Fig. 4, and each having an annular counterbored opening whereby a matrix supporting ledge or shelf is formed around its interior margin. A suitable sound-record matrix 2 rests face upward upon the edge of said shelf, and is clamped in place by the overhanging lip of the retaining-ring 3, which latter is secured to the plate, as by screws 4. This leaves the back or reverse of said matrix free and exposed. Preferably there will be a similar but inverted plate 5, with an inverted matrix 6 and its retaining-ring 7; and the two plates are provided with registering hinge-members 8, which preferably have vertically-alined but oppositely-disposed key-hole slots for receiving loosely a hinge-pintle 9. Preferably also, the opposing faces of the two retaining-rings (3 and 7) are hollowed out, as shown, to provide both a cutting-off device for the edge of the pressed sound-record, and also an annular overflow-space 10 for the excess material. When two such dies, as 1—2 and 5—6, are thus hinged together, so as to be swung closed (as in Fig. 1) or opened out flat (as indicated in 1'—5', in Figs. 3 and 4) they constitute what will be referred to as a book mold; and a handle 11 (see Figs. 3 and 4) may conveniently be secured to the upper member. 12 represents the lower jaw or platen of any suitable press, such as the hydraulic press usually employed in manufacturing sound-records. The upper face of this platen is stepped, to conform to the reverse face of the die so as to support and contact with every part of the matrix uniformly throughout its entire area. 13 is the similarly-shaped upper platen of said press, which similarly conforms to the reverse face of the upper die. These two platens are hollow, and are provided with the usual or any suitable ports, indicated at 14, for the heating and cooling mediums (as live steam and running water).

Figs. 1 and 2 set forth the preferred structure and arrangement of a record ejecting plate, one for each matrix. The central portion of the matrix is cut away to leave a beveled circular opening; and in this is fitted the main ejecting-plate 15, having around its upper margin a slightly-raised beading, which affords a beveled lip that rests upon the corresponding bevel of the matrix; and from the center of said plate rises a circular face-boss which rises to the same level as the upper surface of the retaining-ring 3. This face-boss in conjunction with the face-boss on the upper die produces the central hole in the pressed record. The ejecting-plate is detachably held in position, as by the centrally-apertured retaining-plate 16, which fits over a circular boss upon the reverse of the main plate, and is detachably secured thereto, as by countersunk key-hole slots engaging headed studs 17 that protrude from the reverse of the main plate. Preferably the two surfaces of this complete ejecting-plate lie flush with the two surfaces of the matrix. The back of the matrix is countersunk sufficiently to permit a slight vertical play of the ejecting plate, the beveled edge of the retaining-plate 16 defining the limit of movement. Preferably the retaining-plate will be locked against rotation, as by a slitted spring-tongue 18, whose down-turned end enters a seat in the reverse of the main plate; so that, by inserting the finger into the cut-away space 19, said spring-tongue can be freed, and the retaining-plate rotated sufficiently to become disengaged, in order to remove the ejecting-plate so as to permit substitution of a different matrix.

The lower member or die of each mold aforesaid is provided with a horizontal offset ear 20 (20'), having a curved slot whose outer end is normally closed, as by a pivoted gate 21. Upon opening the gate the slot can be passed over its post 22 adjacent the side of the press, and thereupon said gate is closed and secured in place, as by a cotter-pin. The mold is thus loosely journaled or hinged to the press and can be swung horizontally into the press, in folded position, as indicated at 5'' in Figs. 3 and 4, or can be swung horizontally outward, and opened flat, in the position indicated by 1'—5'.

Preferably two of these molds will be employed in connection with the same press, each journaled as said on its respective post at one side of and near the front of the press. And, to attain the highest efficiency in the alternate use of the two molds, there is installed a table 23, at about the level of the lower platen when the press is fully opened. This table extends along the front and the two sides of the press, and preferably is provided with heating-devices, mold openers and means for elevating the record ejecting-plates.

The front portion of the table is inclosed, to constitute a steam-table or chest 24 (as indicated in Fig. 3), with suitable ports and pipes for the circulation of the steam; and preferably it is provided with hollow bosses 25 (shaped as already described for the press-platens) to fit directly against the reverse of the two matrices, and so located as to register respectively with the two matrices when the mold has been swung open into the position 1'—5'.

For opening a mold, preferably one or both of the die plates of each mold will be provided with a tapering recess 26 (see Fig. 4) located on the inner face, at the margin opposite the hinge; and, for coöperation therewith, a horizontally-disposed wedging-member or opener 27 will be secured upon the table, near the rear of each side-portion thereof, one for each of the molds. Each opener 27 is so located that, when the folded mold has been swung around into the position indicated by dotted lines 5''', said opener will have entered said recess 26 and pried apart the two members of the mold.

For elevating the record ejecting-plates, means are mounted on the side portions on the table preferably one for each die of the mold. Said means preferably consists of a vertical plunger 28, actuated by the pivoted lever 29, whose outer end constitutes a handle. The two plungers and the opener at each side of the press are so located that, when the folded mold has been first swung around into said dotted position 5''', and there stopped and pried apart by the opener 27, and thereafter opened out flat,—thereupon the ejecting-plate of each matrix will register with the corresponding ejecting-plunger 28. On opening, sometimes the pressed record (or other article) adheres to one die and sometimes to the other; therefore a plunger is provided for each die.

The mode of operation is substantially as follows: One of the molds is spread open upon the steam table in front of the press and the dished backs of its dies centered on the bosses 25 of the steam table 24 (see Fig. 3) for heating the matrices; in the meantime a label may be placed face downward upon each matrix, and any suitable record-material applied—as, for example, in U. S. Letters-Patent No. 941,975. By that time the dies will be sufficiently heated. The mold is then closed and swung about its pivot post 22 into the press, which is then set in operation in the usual manner, while steam circulates through its platens to maintain the mold and its contents in heated condition. As soon as the pressure has been maintained sufficiently long—and only a very few seconds will suffice—the steam is cut off and simultaneously cold water is introduced into the hollow platens, for chilling the molds and its contents. A very few seconds cooling will suffice. Upon opening the press the operator grasps the handle 11 of the mold and swings the same about its pivot post 22 against the wedge-shaped opener at the rear of the table (see dotted line position 5''' in Fig. 4). This pries the dies apart whereupon they are spread out flat on the table in which position the ejecting plungers 28 register with the record-ejecting plates at the center of the respective matrices. After the record has been ejected and removed the mold is swung around to position on the steam table and the operations above described repeated.

With two of these molds upon the same press, one single workman can operate continuously, at great speed, by four sets of manipulations, viz: (1) he spreads open the mold 1'—5' on the steam-table and applies the record-material; (2) leaving the same in place to be suitably heated, he meantime opens the press and swings the cooled mold 5'' out (and over the opened mold) and around to the left side of the table,—the latter part of this operation causing the opener 27' to pry apart the two die-members of said mold 5''; (3) then he closes the mold 1'—5' (which, with its contents, has meantime been heating), and swings it into the press, and starts the press in operation; and (4) he then ejects the record from the opened mold 5'', and puts the record into a tray, and swings that opened mold around upon the heating-table in front, ready to continue as already explained with mold 1'—5'.

Owing to the minimum quantity of metal in the dies and to the direct contacting of the backs of the matrices with the temperature-changing means comparatively little time is required for heating the matrices up to the proper temperature, and a similarly short chilling-down time is required,—which renders the time for the complete operation very much briefer than heretofore permissible. Further the hinging together of the two dies into a mold, the alternate use of the two molds, the provision of the table for heating and handling the molds, the tethering of each mold to the press, the provision of the mold openers and the ejecting-devices,—all these simplify the manipulations required, and permit them to be completed within the shortened period of necessary temperature-changes. Finally, the pounding and prying heretofore required in separating dies and loosening the sound-records from the matrices, is entirely done away with by the present invention.

The invention has been fully described in all of its details, but only for the sake of clearness. It is to be understood that the invention is not limited to the manufacture of disk sound-records; nor to where a distinct and separable matrix is employed; nor to the use of a two-part mold; nor to the employment of two such molds upon the one press; nor to the use of all of the features set forth, or to the precise construction and arrangement of the parts referred to. On the contrary, some of the features may be employed to the exclusion of others, certain parts may be transposed or inverted, and various other modifications may be made, without in any case departing from the spirit of the invention as set forth in the appended claims.

The invention having been thus fully set forth, what is claimed is:

1. The combination of a press, a table lying flush therewith, two molds comprising foldable dies, said molds being journaled to swing independently from table to press and vice versa, and means for emptying said molds, said means comprising mold openers mounted on said table and serving upon the outward swinging of the respective molds to pry open the same, a movable plate secured in the floor of each die, and plate-actuating means mounted upon said table.

2. The combination of a press, a table lying flush therewith, a mold comprising a pair of dies, said mold being journaled to swing from table to press and vice versa, and means for emptying said mold, said means comprising a mold opener mounted on said table and serving upon the outward swinging of said mold to pry open the same, a movable plate secured in the floor of a die, and a plunger mounted upon said table for co-acting with said plate.

3. The combination of a press, a table, a two-member mold journaled to swing along said table, a movable plate secured in the floor of each member of said mold, an ejecting-device located upon said table for each plate, and a mold opener mounted on said table and serving upon the outward swinging of said mold to pry open the same and to stop it in such position that its movable plates register with their respective ejecting-devices.

4. The combination of a press, a flush table adjacent thereto, a two-member mold journaled to said press and adapted to be swung from table to press and vice versa, and record-ejecting means consisting of a movable plate in the floor of the mold and a plunger mounted upon said table actuated by a lever and adapted to co-act with said movable plate.

5. The combination of a table, a two-member mold journaled to swing along the same, a movable plate located in the floor of each member of the mold, and an ejecting-device mounted upon said table for each said plate.

6. The combination of a table, a two-member mold journaled to swing along the same, and a mold opener mounted rigidly upon said table and adapted upon the swinging of said mold to pry open the same.

7. The combination of a press, a flush table located around the same, two molds journaled to said press, and mold opening device and record-ejecting means for said molds.

8. The combination of a press, a flush table located around the same, two molds journaled to said press, and mold opening devices mounted on said table.

9. The combination of a press having a heating and chilling boss upon each platen, a table located around said press and having a heating boss, and a two-member mold having dished backs adapted to fit over said bosses.

10. The combination of a press having a heating and chilling boss on each platen, and a two-member mold having dished backs adapted to fit over said bosses.

11. A mold composed of two members hinged to be folded together, the faces and the backs of said members being co-extensively recessed to provide exterior dished backs and a corresponding interior molding-space.

12. A pair of die-rings hinged to fold together, and a sound-record matrix secured around its margin to each ring to expose its reverse.

13. A mold comprising a pair of dies each consisting of a pair of rings detachably clamping the margin of a matrix, and means for hinging the dies to fold together to provide a closed space between the matrices.

14. A die consisting of a matrix, and two rings detachably clamping the margin of said matrix while leaving its two surfaces exposed.

15. The combination with a press, of a two-part skeleton-die hinged thereto.

16. The combination with a press, of two two-part skeleton-dies independently hinged thereto.

17. The combination with a press and a die, of means connecting them and permitting the die to be moved into and out of and partly around the press.

18. The combination with a press and a die, of a pin and slot connection between them permitting the die to be moved into and out of and partly around the press.

19. The combination with a press and a pair of independent dies, of means individually connecting them to the press whereby they may be moved into and out of and partly around the press.

20. The combination with a press and a pair of independent dies, of means individually connecting them to the press for permitting movement of the same in horizontal and vertical planes in moving into and out of the press.

21. The combination with a press and a table of a mold pivoted to the press and mold opening means on the table.

22. The combination with a press and a table of a mold member pivoted to the press, and movable means on the table for raising a portion of the floor of said member.

23. The combination of a press having a heating and chilling boss, and a die having a dished back adapted to be removably centered on said boss.

24. A die comprising a plate having a counterbored opening, a matrix-supported by the shelf formed by the counterbore, and means for securing the matrix to said plate.

25. A die dished on both sides whereby to provide a molding recess on one side and a platen receiving recess on the other.

26. In a machine for pressing records, the combination with a press, of a fulcrum adjacent the press, an upper die and means for supporting the same comprising a lower die movable on said fulcrum.

27. In a machine for pressing records, the combination with a press, of a pivot post adjacent the press, an upper die and means for supporting the same comprising a lower die to which the upper die is hinged, and means connecting the lower die to said post.

28. In a machine for pressing records, the combination with a press, of a pair of fulcrum points equidistant from the center of the press, a plurality of heating elements spaced from said points and equidistant from the center of the press, an upper die and a lower die for supporting the same having a shiftable fulcrum on one of said points, a second upper and lower die similarly arranged on the other said point, whereby both sets of dies may be alternately heated face up on the same heating elements.

29. In a machine for pressing thermoplastic material, a press, a table surrounding the press comprising a heating portion in proximity to the press, and a product-removal portion in proximity to the press and the heating portion, a mold, the table adapted to receive the mold and to permit lateral movement thereof from the press to the product-removal portion, from the product-removal portion to the heating portion, and from the heating portion back to the press.

30. In a machine for pressing thermoplastic material, a press, a table surrounding the press comprising a heating portion in proximity to the press, and a product-removal portion in proximity to the press and the heating portion, a fulcrum adjacent the press, a mold supported upon the table adapted to swing laterally about the fulcrum from the press to the product-removal portion, from the product-removal portion to the heating portion, and from the heating portion to the press.

31. In a machine for pressing thermoplastic material, a press, a table surrounding the press comprising product-removal portions at each side of the press in proximity thereto, and a heating portion in proximity to the press and intermediate the product-removal portions, a pair of fulcrums, one at each side of the press, a pair of molds supported upon the table adapted to be swung laterally about the respective fulcrums, one mold adapted to be swung from the press to the product-removal portion at one side of the press, from the product-removal portion to the heating portion, and from the heating portion to the press, the other mold adapted to be swung alternately with the first mold from the press to the product-removal portion at the other side of the press, from the product-removal portion to the heating portion, and from the heating portion to the press.

32. In a machine for pressing thermoplastic material, a press, a table surrounding the press, comprising a heating portion in proximity to the press, and a product-removal portion in proximity to the press and the heating portion, a book-mold supported upon the table comprising upper and lower dies hingeably connected, the table permitting lateral movement of the mold from the press to the product-removal portion, and from the product-removal portion to the heating portion, the book-mold adapted to be opened upon the heating portion to charge it with material and to heat both dies, the mold adapted to be closed and moved laterally from the heating portion to the press.

33. The combination of a sound record press, and mold therein, a table adjacent the press and having a product-removal portion and a combined heating and charging portion, and means permitting the movement of the mold between the press and the two portions.

34. The combination of a sound record press, two molds adapted to be alternately moved into the press, a table adjacent the press and having a combined heating and charging portion, product-removal portions for the respective molds, and means permitting the movement of the molds between the press, the product-removal portions and the heating and charging portion.

In testimony whereof I have signed this specification.

GEORGE W. BEADLE.